April 22, 1930.  J. P. WALKER  1,755,527
SEPARATOR LOUVER
Filed March 19, 1928
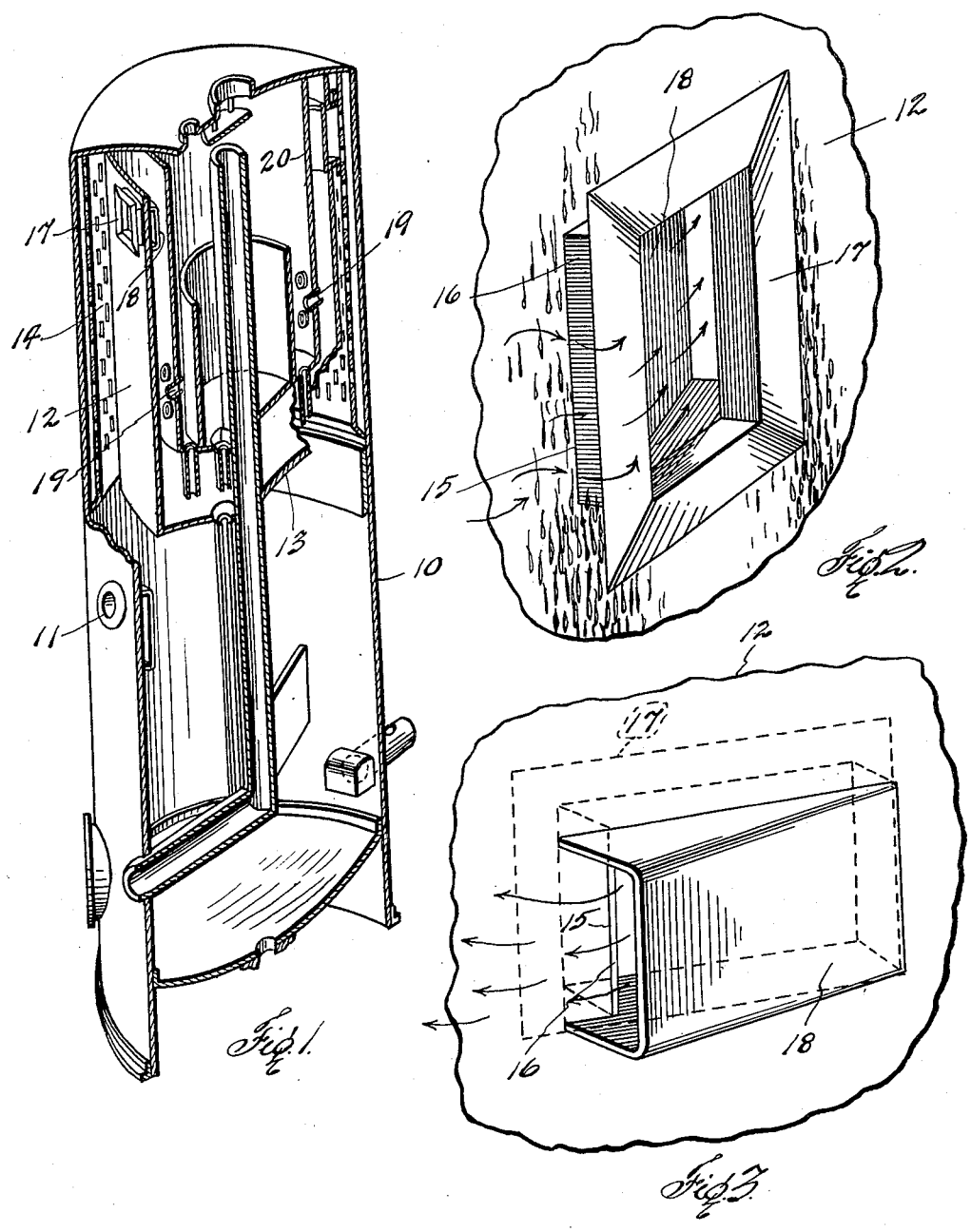
INVENTOR
J.P.Walker
BY
ATTORNEY Patented Apr. 22, 1930

1,755,527

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

SEPARATOR LOUVER

Application filed March 19, 1928. Serial No. 262,955.

This invention relates to new and useful improvements in separator louvers.

One object of the invention is to provide a louver for a baffle shell in an oil and gas separator so arranged as to deflect the oil passing down the outside of the shell and causing only the gaseous fluids to pass through the louver.

Another object of the invention is to deflect the gases on the inside of the baffle shell and induce the same to take a downward helical course within said baffle shell.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of an oil and gas separator of a typical form and having therein a baffle shell equipped with a louver constructed in accordance with the invention, Fig. 2 is a detail in perspective of the louver showing the same from the outside of the shell, and Fig. 3 is a similar view from the inside of the shell.

In the drawings the numeral 10 designates an upright separator tank having an influent opening 11 at mid-height, whereby the mist and gaseous fluids are caused to rise within said tank. A concentric baffle shell 12 depends from the top of the tank and has a closed bottom 13. A vertical scrubbing channel 14 is formed between the tank wall and the shell 12 and the rising mist and fluids pursue a helical course upwardly in this channel.

The fluids rising helically in the channel will scrub against the outer wall of the shell 12 and the solids in the form of globules of oil will adhere to the outer surface of said shell and pass down the same. It is obvious that unless these liquids were deflected they would be carried through an ordinary opening with the gaseous fluids. In order to carry out an efficient separation, one or more inlet openings 15 are provided in the wall of the shell near its upper end.

In carrying out the invention a rectangular collar 16 is fitted within said opening and extends at right-angles from the outer surface of the shell. A rectangular marginal flange 17 is mounted on the outer edge of the collar and is inclined toward the surface of the shell. The fluids in endeavoring to enter the shell through the opening 15 would be deflected by the collar 16 and diverted outwardly. Such fluids would have to pass around the flange before entering the collar. Such retardation and baffling action would withhold the heavier fluids within the channel and cause them to deposit their liquids upon the surface of the shell and these liquids would pass down the shell around the collar.

The gaseous fluids upon entering the collar and passing through the opening 15 will encounter a flared hood 18 having its discharge end extended beyond the opening 15, as is shown in Fig. 3. The fluids upon striking this hood would be diverted and caused to take a helical course, so as to scrub out the liquids against the inner wall of the shell 12. In order to cause the fluids within the shell to take a downward helical course, outlets 19 are provided in a baffle jacket 20 within said shell and below the hood.

This type of louver has been found very efficient, particularly where the fluids are under high pressure. By reason of its collar and flange sufficient obstruction is provided to scrub out the liquids to a large extent, but on the other hand the obstruction or retardation is not sufficient to create an objectionable back pressure. The hood on the inside induces a further scrubbing and extraction of the liquids and also tends to keep down undue agitation.

Various changes in the size and shape of the different parts, as well as modifications and alterations, may be made within the scope of the appended claims.

What I claim, is:

1. The combination with a tank and spaced separator baffle shell therein having an inlet opening, of a louver surrounding said shell opening and including a collar extending outwardly from the shell for deflecting an influent from the inlet opening, and a flared hood on the inside of said shell.

2. The combination with a tank and spaced separator baffle shell therein having an inlet opening, of a louver surrounding said shell opening and including a collar extending outwardly from the shell, a flange on the outer end of the collar inclined toward the shell for deflecting an influent from the collar, and a hood on the inside of the shell flared from the opening thereof.

3. The combination with a tank and spaced separator baffle shell therein having an inlet opening, of a louver surrounding said opening and including means for retarding the flow of fluids and the deflecting of liquids from passing therethrough, and also means for directing the influent in a helical course within said baffle.

In testimony whereof I affix my signature.

JAY P. WALKER.